United States Patent
Ide et al.

[15] 3,644,250
[45] Feb. 22, 1972

[54] POLYVINYL CHLORIDE RESIN COMPOSITION HAVING EXCELLENT TRANSPARENCY AND IMPACT STRENGTH

[72] Inventors: Fumio Ide; Kenji Okano; Seiji Deguchi, all of Hiroshima, Japan

[73] Assignees: Mitsubishi Rayon Co., Ltd.; Nitto Chemical Industry Co., Ltd., Tokyo, Japan

[22] Filed: July 9, 1969

[21] Appl. No.: 840,240

[30] Foreign Application Priority Data

July 10, 1968  Japan.................................43/48360
July 12, 1968  Japan.................................43/48854

[52] U.S. Cl.................260/23.7 R, 260/23 XA, 260/23.7 M, 260/876 R
[51] Int. Cl................................................C08f 29/22
[58] Field of Search...............260/876, 23.7, 23 X, 890, 80.7

[56] References Cited

UNITED STATES PATENTS 3,288,886  11/1966  Himei et al. ..........................260/876
3,312,756  4/1967  Baer et al...............................260/876

*Primary Examiner*—Donald E. Czaja
*Assistant Examiner*—Donald J. Barrack
*Attorney*—William D. Hall, Elliott I. Pollock, Fred C. Philpitt, George Vande Sande, Charles F. Steininger and Robert R. Priddy

[57] ABSTRACT

PVC resin compositions of improved transparency and impact are obtained by mixing the PVC with a graft polymer. The graft is produced by grafting first styrene and then methyl methacrylate onto an elastomer of butadiene, n-butyl acrylate, and styrene in the proportions shown in the accompanying ternary constitutional diagram. When the monomer(s) used in preparing the aforesaid graft polymer have a small quantity of $C_{10}$ to $C_{18}$ saturated fatty acid dissolved therein, the PVC compositions prepared from the graft polymer show further improvements in their properties.

4 Claims, 1 Drawing Figure

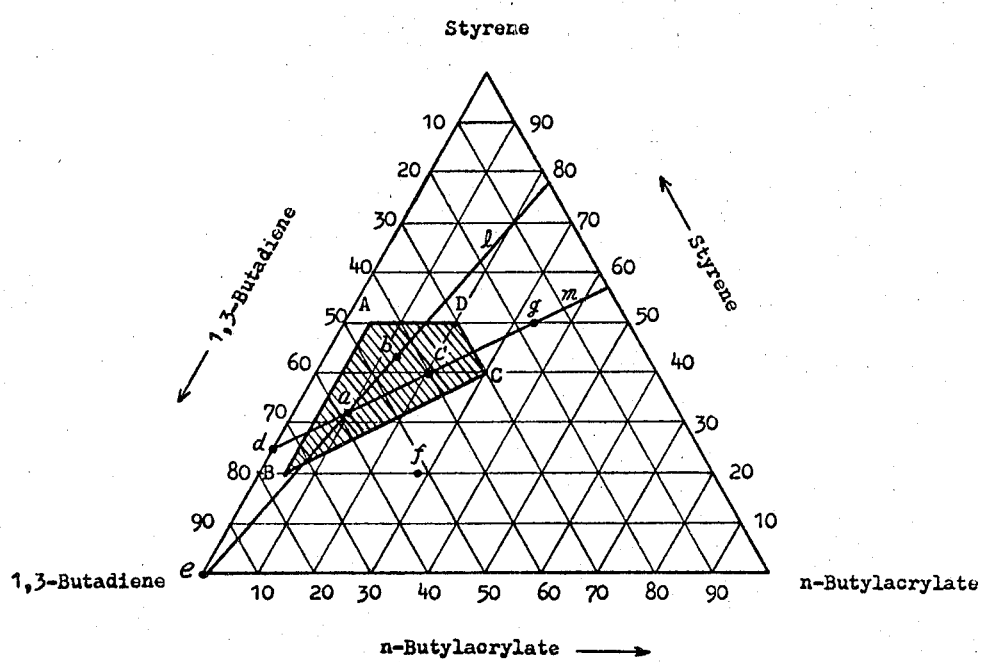

POLYVINYL CHLORIDE RESIN COMPOSITION HAVING EXCELLENT TRANSPARENCY AND IMPACT STRENGTH

The present invention relates to a resin composition mainly comprising a polyvinyl chloride resin (hereinafter called "PVC resin") and having excellent transparency and high impact strength, in particular, to a resin composition comprising 97-60 parts by weight of a PVC resin and 3-40 parts by weight of a graft polymer prepared by polymerizing first styrene in the presence of an elastomer obtained by copolymerizing 75-30 percent by weight 1,3-butadiene, 5-30 percent by weight n-butyl acrylate, and 20-50 percent by weight styrene and thereafter polymerizing methyl methacrylate.

Furthermore, when in the case of polymerizing the monomers in the presence of the elastomer, a higher saturated fatty acid is added to at least one of the monomers, the graft polymer obtained greatly enhances the processabilty and the impact strength of the PVC resin composition.

PVC resins are generally inexpensive and have excellent chemical and physical properties. Thus, they are produced commercially on a large scale for many widely varying uses. However, such resins are somewhat inferior in impact strength and hence various studies have been made for overcoming such a difficulty and various improvements have been reported.

It has been suggested that the impact resistance of PVC resins could be improved by blending them with natural or synthetic rubber, or a thermoplastic resin having such rubber as the base. Although thus obtained modified PVC resin composition shows an improved impact strength as compared with that of the original PVC resin, the composition is generally inferior severely in transparency, that is, the transparency which is one of the merits of PVC resin is severely reduced by improving the impact strength.

It has also been reported that when PVC resin is blended with a resin prepared by graft polymerizing a monomer such as styrene, methyl methacrylate, acrylonitrile, etc., to an elastomer such as polybutadiene or styrene-butadiene copolymer (hereinafter called "SBR"), a composition having an improved impact resistance could be obtained without fatally reducing the transparency of PVC resin.

However, the resin composition having excellent transparency can be prepared by only strictly controlled conditions. When polybutadiene is employed as elastomer for the composition, it is required that the particle size thereof be as small as possible, the gel content (the proportion of such parts that are insoluble in organic solvent such as tuluene) be high, and the swelling index thereof be low. Also, when SBR is used as the elastomer, the particle size thereof is also required to be small. Furthermore, in any case of employing polybutadiene and SBR, the combination thereof with the kind of monomer grafted to the elastomer must be strictly selected. The reasons why such strict restrictions are necessary in the case of employing polybutadiene or SBR as the elastomer are that the refractive index thereof is different from that of PVC resin and also the elastomer has poor compatibility with PVC resin.

An object of the present invention is to improve the low impact strength of PVC resin without reducing the transparency thereof.

Other object of this invention is to provide a resin composition having excellent transparency, high impact resistance even if a PVC resin having a relatively low polymerization degree.

Further object of this invention is to provide a resin composition having excellent transparency and high impact resistance even by using a molding machine having a weak mixing power.

As the results of various investigations for obtaining the composition without having aforesaid faults, the inventors have found an elastomer different from conventional elastomers provides a resin composition having excellent properties and by using such elastomer and selecting the combination of the monomer to be graft polymerized to the elastomer and the polymerization conditions, an excellent resin composition having improved impact strength together with excellent transparency can be obtained.

The portion within area ABCD in the ternary constitutional diagram of the accompanying drawing shows the range of the initial monomer composition constituting the elastomer of 1,3-butadiene, n-butyl acrylate, and styrene used for preparing the resin composition of the present invention. Straight line $l$ in the figure stands for the azeotropic composition in which the initial monomer composition of 1,3-butadiene, n-butyl acrylate, and styrene is same as the composition thereof in the polymer formed at any moment of polymerization and the azeotropic composition gives the most excellent transparency to the terpolymer itself. Straight line $m$ stands for the composition providing an index of refraction like that of polyvinyl chloride.

By only using the elastomers having such compositions as above, the high transparency can be provided to copolymer prepared therefrom. However if one of such a monomer as other acrylic esters than n-butyl acrylate, vinyl chloride, vinylidene chloride, or acrylonitrile instead of n-butyl acrylate in the elastomer are used, the elastomer thus prepared cannot give a resin composition having excellent transparency and high impact resistance.

The merit of using the aforesaid elastomer in the present invention is that the control of the particle size of the elastomer particles is not so important as in the case of using polybutadiene or SBR. For example, in the case of using polybutadiene or SBR, a good transparency cannot be provided to a PVC resin composition if the elastomer particles having particle sizes less than 0.2 micron are not present therein in a proportion of higher than 90 percent. On the other hand, in the case of using the aforesaid elastomer of this invention, a good transparency can be provided to a resin composition even if the elastomer particles having the particle sizes of higher than 0.2 micron are present in a proportion of only about 40 percent by weight.

Moreover, when SBR is employed as the elastomer, the resin has uneven structure and also the transparency and other properties of the final product are largely influenced by the conversion of polymerization of SBR since the structure and the refractive index thereof are varied by the variation in conversion of polymerization thereof. On the other hand, as the elastomer used in the present invention has an azeotropic composition or a composition similar to the azeotropic composition, the elastomer is scarcely influenced by the conversion of polymerization and has a very homogeneous structure.

The composition of the present invention comprises a graft polymer (I) prepared by grafting styrene to a 1,3-butadiene-n-butyl acrylate-styrene elastomer (hereinafter, called "elastomer (E)") and then grafting methyl methacrylate and PVC resin (II).

Graft polymer (I) which is one component of the resin composition of the present invention may be prepared by grafting first styrene to elastomer (E) while adding the monomer to a latex of the elastomer in one fell swoop or continuously and then grafting methyl methacrylate thereto while adding the latter monomer in one fell swoop of continuously (process A) but in order to particularly facilitate the kneading of the graft polymer with PVC resin, the graft polymerization is conducted by dissolving a saturated fatty acid having 10-18 carbon atoms in at least one of styrene and methyl methacrylate to be grafted in an amount of 0.5-5 parts by weight per 100 parts by weight of the graft polymer and adding continuously the solution to the polymerization system (process B).

The resin composition consisting of the graft polymer prepared by any of the aforesaid processes and a PVC resin is quite excellent in impact strength as compared with a resin composition of a graft polymer prepared by grafting a mixture of styrene and methyl methacrylate simultaneously to the elastomer and a PVC resin, and further even if the average polymerization degree of the PVC resin employed for producing the resin composition is low, the impact strength of the composition thus prepared is very high. Moreover, when the graft polymer prepared by using the monomers shown above, at least one of which contains a saturated fatty acid having 10–18 carbon atoms employed, the resin composition prepared from the graft polymer and a PVC resin is very effective for providing a product having excellent impact strength by using a molding machine having a weak kneading power.

The typical examples of the saturated fatty acid used in process B shown above are capric acid, palmitic acid, lauric acid, myristic acid, and stearic acid and they may be used individually or as a mixture thereof.

In the case of conducting the graft polymerization by process A, styrene and/or methyl methacrylate may be added in one fell swoop or continuously.

When the monomer is added continuously, the sheet or film formed by extruding the resin composition is superior in smoothness slightly to the case of adding the monomer in one fell swoop and also the board of the composition formed by molding is superior in transparency but slightly lower in impact strength.

On the other hand, in process B wherein the saturated fatty acid is employed, it is necessary to add continuously the monomer containing the saturated fatty acid to the elastomer (E) over at least a 30-minute period and otherwise, a large amount of coagulates are formed, which reduce the transparency of the final product.

Furthermore, it is necessary that graft polymer (I) be composed of 30–70 percent by weight elastomer (E) and 70–30 percent by weight of the total amount of styrene and methyl methacrylate to be grafted thereto, and also the graft monomer to be grafted be composed of 10–50 percent by weight of methyl methacrylate and 90–50 percent by weight of styrene. If a graft polymer having other composition than above is employed, at least one of the transparency, impact resistance and other mechanical properties of the resin composition prepared therefrom will be reduced.

The graft polymerization is generally carried out at a temperature of 30°–100° C., in the presence of a usual polymerization initiator, Furthermore, if necessary, a small amount of an emulsifier, a chain transfer agent and a modifier may be employed.

The latex of the graft polymer thus prepared is coagulated by a known method, washed with water and then dried.

PVC resin (II) which is another component of the resin composition of the present invention may be polyvinyl chloride or a copolymer of more than 70 percent by weight of vinyl chloride and less than 30 percent by weight of at least one monomer of vinyl bromide, vinylidene chloride, vinyl acetate, acrylic acid and methacrylic acid. The PVC resin used in the present invention may be prepared by a conventional emulsion polymerization, suspension polymerization, or bulk polymerization.

For obtaining the resin composition of this invention, 3–40 parts by weight of graft polymer (I) is blended with 97–60 parts by weight of PVC resin (II) to provide 100 parts by weight of the final product. When the proportion of graft polymer (I) is less than 3 parts by weight, no effect of adding the polymer is obtained, while if the proportion of the polymer is higher than 40 parts by weight, other excellent properties of PVC resin than transparency will be lowered as well as the use of such a large proportion of polymer is not economical. The particularly preferable composition of the present invention comprises 10–30 parts by weight of graft polymer (I) and 90–70 parts by weight of PVC resin (II).

Graft polymer (I) is blended with PVC resin (II) by using a conventional mixing means. For example, they may be mixed by a mixing roll, a Banbury mixer, or a plastograph as well as a molding machine such as a compounding extruder and a blow molder. Also, they may be premixed by means of a ribbon blender or a Henschel mixer before mixing them by means of the aforesaid mixing machine. Moreover, as mixing, there may be added to the system, if necessary, a conventional stabilizer, a plasticizer, a lubricating agent, a pigment, a filler, etc.

The invention is illustrated in part by the following examples, which are given for the purpose of showing several ways in which the invention may be practiced and not for the purpose of limiting the invention. In the examples, "part" and "percent" mean "part by weight" and "percent by weight" respectively.

EXAMPLES 1–3

Preparation of Elastomer (E–1)

| | |
|---|---|
| 1,3-Butadiene | 57 parts |
| n-Butyl acrylate | 10 parts |
| Styrene | 33 parts |
| Potassium oleate | ( )2 2 parts |
| Potassium persulfate | ( )2 0.3 parts |
| t-Dodecyl mercaptan | ( )2 0.5 parts |
| Deionized water | 180 parts |

The above mixture was charged to an autoclave and after purging with nitrogen, the charge was polymerized for 15 hours at 55° C. with stirring to provide the elastomer (E–1) in a conversion of 97 percent based on the monomers charged.

Preparation of Graft Polymer (G–1)

| | |
|---|---|
| Elastomer E–1 | 50 parts (by solid content) |
| Styrene | 30 parts |
| Methyl methacrylate | 20 parts |
| Potassium persulfate (total) | 0.5 parts |
| Deionized water | 200 parts |

Thus, according to the aforesaid composition, 30 parts of styrene and 0.3 part of potassium persulfate were first added to a latex of elastomer (E–1), and the mixture was reacted for 3 hours at 70° C. in nitrogen atmosphere. Thereafter, 20 parts of methyl methacrylate and remaining 0.2 part of potassium persulfate were added to the product thus prepared and then the graft polymerization was carried out for 3 hours at 70° C. to provide a latex of graft polymer (G–1). The latex of graft polymer thus formed was coagulated by a 0.2 percent aqueous sulfuric acid solution followed by washing with water and then drying to provide white powders of graft polymer (G–1).

In a Henschel mixer were blended the graft polymer and PVC resin (having average degree of polymerization P of 750) together with 2 parts of di-butyl-tin-maleate, 1 part of butyl stearate and 1 part of dibutyl-tin-laurate per 100 parts of PVC resin for 20 minutes. The compound thus obtained was extruded by means of an extruder having T-die at 190° C. to provide a sheet of the resin composition and the properties of the sheet were measured, the results of which are shown in Table 1.

In addition, two specimens having other compositions than the composition of this invention were prepared for comparison and the results of measuring the properties of them are also shown in the table as comparative examples.

TABLE 1

| | | Properties of the PVC composition | | |
|---|---|---|---|---|
| Example number | PVC/graft polymer composition | Impact strength (kg.-cm./mm.)[1] | Luminous transmittance (percent)[2] | Haze value (percent)[2] |
| Comparative Example 1 | 100/0 | 22.6 | 81.6 | 4.2 |
| Example: | | | | |
| 1 | 90/10 | 77.8 | 80.1 | 4.5 |
| 2 | 80/20 | 128.5 | 76.4 | 4.7 |
| 3 | 70/30 | ([4]) | 75.8 | 5.1 |
| Comparative Example 2 | 50/50 | 63.2 | 73.2 | 12.4 |

[1] Measured according to BS1524-1955 (0.3 mm sheet thick).
[2] Total luminous transmittance measured according to ASTM D1003-61 (press molded sheet).
[3] Measured according to ASTM D1003-61.
[4] Undestroyed.

EXAMPLE 4–9

The elastomers having the compositions shown in Table 2 were prepared and graft polymers were prepared using the elastomers. The same procedure as in Example 1 was conducted using the graft polymers and PVC (P 750) to provide the resin composition of the present invention and the properties of them were measured. For comparison, other resin compositions than those of the present invention having the composition outside the area ABCD of the ternary constitutional diagram were prepared and the properties of them were also measured.

Each graft polymer was prepared by grafting first 27 parts of styrene in the presence of a latex containing 55 parts of elastomer having an average particle size of 0.15 micron and then by grafting 18 parts of methyl methacrylate.

parts of methyl methacrylate was grafted thereto to provide graft polymers. Resin compositions consisting of 15 parts of the graft polymers and 85 parts of PVC (P 730) were prepared and their luminous transmittances were measured, the results of which are shown in Table 3.

For comparison, comparative resin compositions prepared by using the same amount of polybutadiene or SBR (23.5 percent styrene) were prepared and their luminous transmittances were also measured.

As clear from Table 3, the transparency of the resin composition prepared by using polybutadiene or SBR as elastomer

TABLE 2

| | Elastomer composition (percent) | | | Position in the diagram | PVC/graft polymer | Impact strength (kg.-cm./mm.) | Total luminous transmittance (percent) |
|---|---|---|---|---|---|---|---|
| | Bd | BA | St | | | | |
| Example: | | | | | | | |
| 4 | 57 | 10 | 33 | a | 90:10 | 80.6 | 80.2 |
| 5 | 57 | 10 | 33 | a | 85:15 | 126.5 | 80.1 |
| 6 | 45 | 12 | 43 | b | 90:10 | 78.4 | 78.4 |
| 7 | 45 | 12 | 43 | b | 85:15 | 120.1 | 78.2 |
| 8 | 40 | 20 | 40 | c | 90:10 | 76.3 | 77.8 |
| 9 | 40 | 20 | 40 | c | 85:15 | 118.9 | 77.0 |
| Comparative example: | | | | | | | |
| 3 | 75 | 0 | 25 | d | 90:10 | 81.2 | 71.0 |
| 4 | 75 | 0 | 25 | d | 85:15 | 127.4 | 63.8 |
| 5 | 100 | 0 | 0 | e | 90:10 | 82.3 | 60.7 |
| 6 | 100 | 0 | 0 | e | 85:15 | 127.4 | 51.6 |
| 7 | 52 | 28 | 20 | f | 85:15 | 67.6 | 63.3 |
| 8 | 17 | 33 | 50 | g | 85:15 | 48.3 | 54.0 |

NOTE.—Bd=1,3-butadiene; BA=n-butyl acrylate; St=styrene.

As is clear from Table 2, the use of elastomers having compositions defined by points included in the area ABCD in figure results in resin compositions having excellent transparency as compared to those prepared with the elastomer having compositions outside the area ABCD.

EXAMPLES 10–13

Elastomer latices each having different average particle sizes were prepared by using a mixture of 57 percent 1,3-butadiene, 10 percent n-butyl acrylate, and 33 percent styrene. Thereafter, 30 parts of styrene was first grafted in the presence of a latex of 50 parts of the elastomer and then 20 was largely influenced by the particle size of the elastomer. That is, in the case of using polybutadiene, the transparency of the resin composition was reduced when the particle size of the elastomer was larger than 0.12 micron and also in the case of using SBR as the elastomer, the transparency was reduced when the particle size was larger than 0.18 micron. On the other hand, in the case of using the elastomer in the present invention, the resin composition having good transparency was obtained even when the elastomer having a comparatively large particle size was employed.

TABLE 4

| | Grafting monomer compositions | | Grafting method | Properties of the products | | |
|---|---|---|---|---|---|---|
| | St | MMA | | Impact strength | Luminous transmittance (percent) | Haze (percent) |
| Example: | | | | | | |
| 14 | 80 | 20 | I | 78.1 | 78.4 | 7.6 |
| 15 | 70 | 30 | I | 88.9 | 79.6 | 5.2 |
| 16 | 50 | 50 | I | 75.2 | 79.2 | 4.4 |
| Comparative Example: | | | | | | |
| 17 | 70 | 30 | II | 57.2 | 71.3 | 8.3 |
| 18 | 60 | 40 | II | 53.5 | 74.6 | 8.8 |
| 19 | 30 | 70 | I | 27.4 | 51.3 | 38.7 |

MMA=Methyl methacrylate.
St=Styrene.
I=2-stage grafting method (St. was first polymerized in the presence of elastomer and then MMA was polymerized).
II=1-stage grafting method (a mixture of MMA and St was polymerized in the presence of elastomer).

TABLE 3

| Elastomer employed | Average particle size of the elastomer (μ) | Total luminous transmittance (percent) |
|---|---|---|
| Example: | | |
| 10 | Bd/BA/St=57/10/33 | 0.08 | 78.5 |
| 11 | Bd/BA/St=57/10/33 | 0.12 | 78.0 |
| 12 | Bd/BA/St=57/10/33 | 0.18 | 77.4 |
| 13 | Bd/BA/St=57/10/33 | 0.22 | 75.1 |
| Comparative Example: | | |
| 9 | Polybutadiene | 0.08 | 68.6 |
| 10 | do | 0.12 | 62.1 |
| 11 | do | 0.18 | 56.3 |
| 12 | do | 0.22 | 53.1 |
| 13 | SBR | 0.08 | 77.2 |
| 14 | SBR | 0.12 | 72.6 |
| 15 | SBR | 0.18 | 62.5 |
| 16 | SBR | 0.22 | 59.3 |

This is because the elastomer used in the present invention has a uniform component distribution, and a good compatibility with and a nearly same refractive index as those of PVC, and also provide a graft polymer having a high grafting efficiency since the elastomer is properly swollen with the monomer to be grafted to the elastomer.

EXAMPLES 14–16

To 50 parts of the elastomer consisting of 57 percent 1,3-butadiene, 10 percent n-butyl acrylate and 33 percent styrene was grafted 50 parts of the monomers as shown in Table 4 to provide graft polymers. The properties of the resin composition consisting of 8 parts of the graft polymers and 92 parts of PVC having a degree of polymerization of 710 are shown in Table 4.

As shown in the above table, the comparative specimens were inferior in luminous transmittance and impact strength and also when methyl methacrylate and styrene were grafted simultaneously, the resin composition prepared had no excellent properties.

EXAMPLE 17

To 40 parts of the elastomer consisting of 53 percent 1,3-butadiene, 15 percent n-butyl acrylate, and 32 percent styrene was supplied and grafted continuously 30 parts of styrene over a 1-hour period. Thereafter, 30 parts of methyl methacrylate was added and grafted continuously over a 1-hour period to provide a graft polymer. From 10 parts of the graft polymer thus prepared and 90 parts of a copolymer consisting of 93 percent vinyl chloride and 7 percent vinyl acetate was prepared the resin composition. The impact strength and the luminous transmittance of the resin composition were 62.8 kg.-cm./mm. and 78.6 percent respectively.

EXAMPLE 18

To 55 parts of the elastomer consisting of 65 percent 1,3-butadiene, 12 percent n-butyl acrylate and 23 percent styrene was grafted first 28 parts of styrene while supplying of the monomer in having dissolved therein 2 parts of stearic acid continuously over a 1-hour period and thereafter 17 parts of methyl methacrylate was grafted to the product while supplying continuously the monomer in having dissolved therein 1 part of stearic acid over a 1-hour period to provide a graft polymer. From 7 parts of the graft polymer and 93 parts of PVC (P 700) a resin composition was prepared. The impact strength and the luminous transmittance of the composition were 58.6 kg.-cm./mm. and 81.0 percent respectively.

What is claimed is:

1. A resin composition comprising

I. 3–40 parts by weight of a graft polymer prepared by polymerizing first 90–50 percent by weight styrene in the presence of 30–70 parts by weight of elastomer (E) prepared by copolymerizing a monomer mixture comprising 75–30 percent by weight 1,3-butadiene, 5–30 percent by weight n-butyl acrylate, and 20–50 percent by weight styrene and having the component ratio within area (ABCD) in the ternary constitutional diagram of the accompanying drawing and then polymerizing 10–50 percent by weight methyl methacrylate, the total amount of said monomers being 70–30 parts by weight, and II. 97–60 parts by weight of polyvinyl chloride or 97–60 parts by weight of a copolymer comprising more than 70 percent by weight vinyl chloride and less than 30 percent by weight at least one of vinyl bromide, vinyl acetate, vinylidene chloride, acrylic acid and methacrylic acid.

2. The resin composition as claimed in claim 1 wherein said graft polymer is prepared by polymerizing styrene and methyl methacrylate while adding continuously at least one of the monomers to said elastomer over an at least 30-minute period.

3. The resin composition as claimed in claim 2 wherein at least one of styrene and methyl methacrylate to be polymerized in the presence of said elastomer (E) has uniformly dissolved therein 0.5–5 percent by weight based on said graft polymer of a saturated fatty acid having 10–18 carbon atoms.

4. The resin composition as claimed in claim 1 wherein said elastomer (E) is a terpolymer comprising 55–60 percent by weight 1,3-butadiene, 8–13 percent by weight n-butyl acrylate, and 30–38 percent by weight styrene.

* * * * *